(No Model.)　　　　　　　　　　　　　　　　2 Sheets—Sheet 1.

J. KEYS.
HARVESTER REEL AND RAKE.

No. 256,901.　　　　　　　　　Patented Apr. 25, 1882.

Attest.
Sidney P. Hollingsworth
Newton Wyckoff.

Inventor.
John Keys.
By his Atty.
Philip T. Dodge.

(No Model.) 2 Sheets—Sheet 2.
J. KEYS.
HARVESTER REEL AND RAKE.
No. 256,901. Patented Apr. 25, 1882.
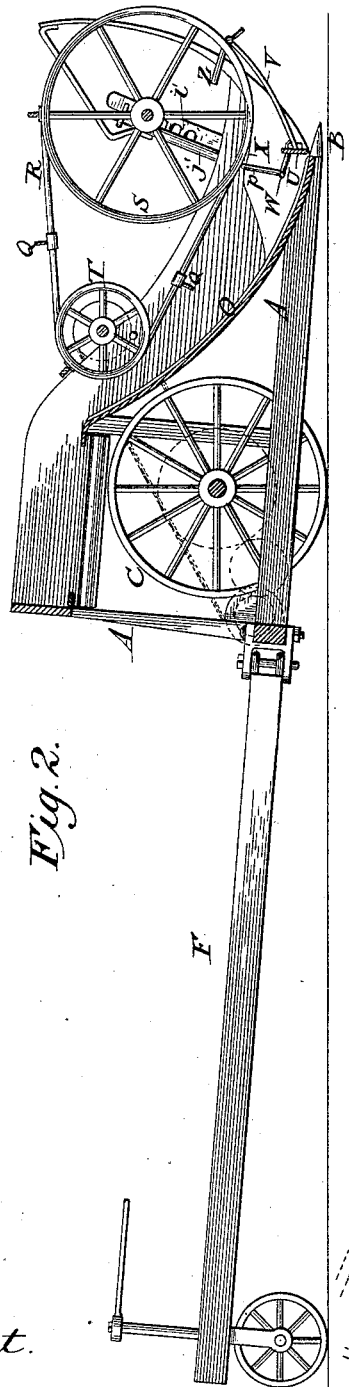
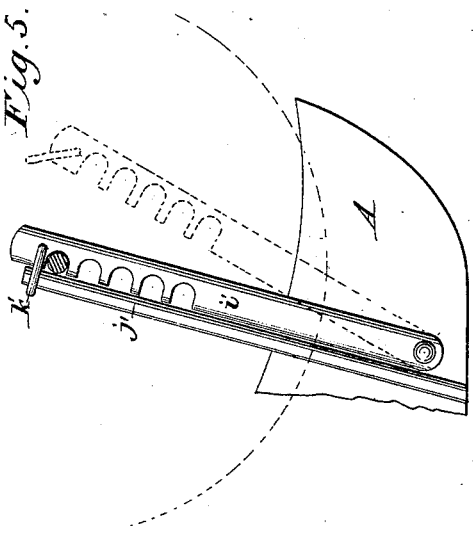
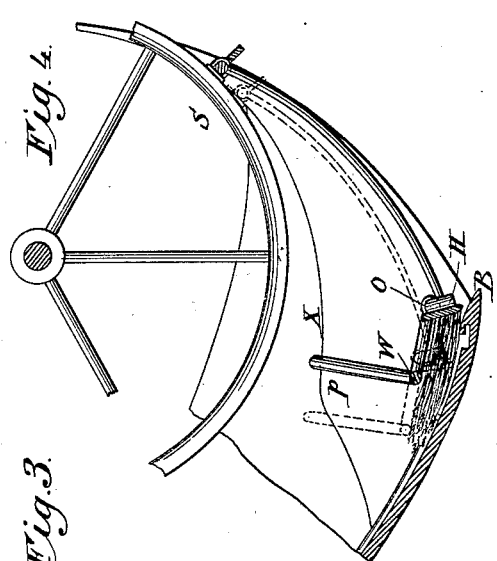
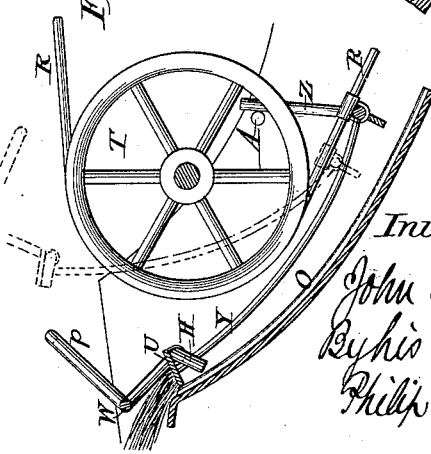
Attest.
Sidney P. Hollingsworth
Newton Wyckoff
Inventor.
John Keys.
By his Atty.
Philip T. Dodge.

UNITED STATES PATENT OFFICE.

JOHN KEYS, OF BELOIT, KANSAS, ASSIGNOR OF ONE-HALF TO GEORGE W. PORT, OF SAME PLACE.

HARVESTER REEL AND RAKE.

SPECIFICATION forming part of Letters Patent No. 256,901, dated April 25, 1882.

Application filed March 2, 1882. (No model.)

*To all whom it may concern:*

Be it known that I, JOHN KEYS, of Beloit, in the county of Mitchell and State of Kansas, have invented certain Improvements in Reeling and Raking Mechanism for Harvesters, of which the following is a specification.

My invention relates to improved reeling and raking mechanism, designed to serve also the additional purpose of elevating the grain.
To this end it consists essentially in the combination of a platform, upon which the grain is received, with two endless belts located above the platform and provided with transverse reel-bars attached thereto, and with a transverse rake head or bar connected thereto by hinged arms, and parts containing various details and peculiarities hereinafter explained.

Referring to the drawings, Figure 1 represents a top plan view of the machine provided with my improved devices; Fig. 2, a longitudinal vertical section of the same on the line *x x*; Figs. 3 and 4, sectional views on the line *x x*, showing parts of the raking mechanism in different positions; Fig. 5, a side elevation, illustrating the manner of sustaining and adjusting the reel.

In the accompanying drawings I have illustrated my reel as applied to that type of machines in which the main frame is provided with a rearwardly-extending tongue, with which the draft-animals are connected in such manner as to propel the machine in advance of them.

The machine represented in the drawings, aside from the mechanism specifically claimed herein, forms the subject-matter of an application filed by me on the 14th of February, 1882, No. 52,661, to which reference is made for a detailed description.

Referring to the drawings, A A represent a rigid rectangular main frame, provided at the front with a cutting device, B, of any ordinary or approved style, the cutting device and the mechanism for driving the same forming no part of the present invention. The frame A is sustained by two ground-wheels, C, located therein at the rear end, and is propelled and guided by means of a rearwardly-extending tongue, F, pivoted to its rear side, the tongue being sustained by a wheel or wheels at its rear end.

O represents the main platform of the machine, upon which the grain is received from the cutter. The platform extends from the rear edge of the cutter upward and backward, as represented in Fig. 2, preferably in a curved line, although it may be made with a flat face from front to rear. The curvature of the platform is advantageous in that it permits the lower portion to be made substantially horizontal, so that the grain will accumulate thereon between the periodical actions of the rake without there being any tendency of the butts to slide forward. It is manifest that if the inclined face were flat the accumulated grain would have a tendency to slide forward and become entangled at the butts with the standing grain.

The reeling devices consist essentially of transverse reel bars or slats Q, mounted at their opposite ends upon two parallel endless wire belts or chains, R, arranged to move lengthwise of the machine. The endless belts are carried at their forward ends upon large wheels or pulleys S and at their rear ends upon smaller pulleys T, the arrangement being preferably such that the belts approach the platform toward the rear. The motion of the wheels and belts causes the slats to be carried outward on the upper side and inward and backward on the lower side in such manner as to act upon the heads of the grain and throw the same backward over the cutters as required.

The raking device consists essentially of a transverse rake bar or head, U, secured at its ends rigidly to the forward ends of two arms, V, which latter are hinged or pivoted at their rear ends to the carrying-belts R, so that as the arms are carried backward and upward, as indicated in Fig. 2, they push the rake-bar U before them upward over the inclined platform O, the bar acting upon the butts of the grain and pushing the same endwise toward the rear.

Inasmuch as the rake-carrying arms V are hinged loosely to the carrying-belts R, it is necessary to provide means for controlling its position during the different periods of its movement with the belts. I therefore connect the rear end of the two rake-carrying arms V by a transverse rock-shaft and provide the latter with an upright arm, Z, as clearly represented in Figs. 2, 3, and 4. On one side of the main frame, near the rear elevated end of the platform, I locate a pin, A', as plainly represented in the various figures. As the rake-head U completes its upward movement and delivers the butts of the grain from the rear edge of the platform the arm Z encounters the pin A', as plainly represented in Fig. 3, the effect of which is to cause the rake-head and arms to be turned upward and forward, as indicated in dotted lines in Fig. 5, so as to be carried forward on top of the chains R preparatory to dropping into action again at the front of the platform. Inasmuch as the grain in passing up the inclined platform approaches an upright position, there would be danger of its escaping and falling backward over the rake-head unless means were provided to retain it compactly in position upon the platform. For this purpose I provide a presser-bar designed to rest on top of the butts of the grain and hold the same down in front of the rake-head. This bar is represented at W, Figs. 1, 2, 3, and 4. It is provided at its ends with backwardly-extending arms H, which are hinged to the ends of the rake-head U and cranked or bent downward, as represented at o, these cranked ends serving as stops to engage with the rear face of the rake-head, as shown in dotted lines in Fig. 3, thus preventing the bar W from falling backward too far when the rake-head is elevated.

In order to hold the bar W in an elevated position when the rake commences to act upon the grain, so that the bar may be carried over the butts of the grain and rest on the top of the same, the bar is provided at its rear ends with upwardly and outwardly turned arms p, and the main frame provided at the lower front sides of the platform with inclined tracks or cam-faces X, as clearly represented in Figs. 2 and 4. As the rake-head descends to act upon the grain the arms p travel upon and are sustained by the track X, as shown in Fig. 4, thereby holding the bar W in an elevated position, so that it may move backward over or on top of the butts. Immediately after this has occurred the arms p are carried from the supporting-track X, and the bar W is permitted to fall and rest firmly on top of the grain, as shown by dotted lines in Fig. 4.

The essential feature of the invention, as regards the holding of the grain, consists in the use of a bar or presser device to rest on top of the grain and hold the same down while being moved forward by the rake, and it will be manifest to the skilled mechanic that the details of construction may be modified in many respects without essentially changing the mode of action or departing from the spirit of the invention.

It is obvious that the bar W could be rigidly attached to the rake-head in position to rest upon the top of the grain; but the construction represented is preferred.

Motion may be communicated to the raking mechanism by any suitable appliances from other moving parts of the machine.

It is manifest that the raking mechanism constructed as above described may be applied to machines of any suitable construction. I prefer, however, the construction represented in the drawings.

In order to deliver the grain at the side of the machine, I mount behind and immediately beneath the upper end of the platform a transverse endless belt, P, sustained at its ends by rollers, as usual. This belt will be driven by imparting motion to one of its supporting-rolls from any other suitable moving part of the machine. The grain, being carried endwise up the platform and thrust across and upon the transverse apron, will be carried by the latter to the side of the machine and there discharged.

In order to adapt the machine for cutting the grain near the ground, as in ordinary harvesting-machines, or for use as a header, as circumstances may require, I make the reel adjustable vertically at its front when the cutter is adjusted near the ground, as well as when the cutter is raised to a point near the heads of the grain. The manner in which the reel is thus supported is clearly represented in Figs. 2 and 5. The ends of the reel-shaft are mounted in notched bars i', pivoted at their lower ends to sides of the main frame, each bar being provided with a series of notches, into which the shaft may be inserted.

Adjacent to the swinging arm i', I secure rigid upright arms j' to the sides of the harvester-frame, as shown in Fig. 5, in such position that upon swinging the arms i' upward against the arms j' the reel-shaft will be prevented from escaping from its bearings. A swinging link, k', attached to the upper end of the arm i' forms a convenient means of locking the two arms together.

When it is desired to change the height of the reel it is only necessary to release the link k', when the reel-supporting arms j' will fall backward, leaving the bearings exposed, that the reel may be moved from one to the other.

I am aware that a combined rake and reel has been constructed wherein the reel-blades moved in a circular path around a central shaft, while the rake-head was carried by hinged arms, so as to move in an eccentric path. The use of the endless chains permits the rake-head to be given a much greater range of movement, and to be adjusted for practically carrying the grain backward and upward a much greater distance than was possible with the prior device.

As to the combination, with a rake, of means for clamping or holding down the butts of the grain, broadly considered, without confinement to the devices herein shown, the right is reserved of making the same the subject of a separate patent.

Having thus described my invention, what I claim is—

1. In combination with the platform having an upward inclination to the rear, the endless belts or chains having the rake-head hinged thereto, substantially as shown.

2. The combined rake and reel consisting of the endless belts or chains provided with the fixed reel-blades, and the rake-bar attached thereto by hinged arms, substantially as shown.

3. In combination with the platform having an upward inclination to the rear, the endless reel belts or chains provided with the fixed and the hinged blades or bars, and arranged to approach the surface of the platform as they travel from its front to its rear, whereby the slats are caused to assist in retaining the moving grain in position.

4. The combination of the inclined platform, the endless belts or chains, the rake-head connected to the belts by hinged arms, the tripping-arm attached to the hinged arms, and the stud to act upon the tripping-arm and elevate the rake-head at the completion of its action, substantially as shown.

5. In combination with the traveling rake-head, the hinged presser-bar arranged to travel in advance thereof, the sustaining-arms upon said presser-bar, and the stationary tracks or cams to carry the sustaining-arms while the compressor-bar is pressing upon the grain.

6. The combination of the endless chains, the rake-head attached thereto by hinged arms, the presser-bar hinged to and in advance of the rake-head, and means, substantially as described, to sustain the presser-bar until it has passed over the butts of the grain.

7. In combination with the reel, the fixed posts, the notched hinge-post, and means, substantially as described, for securing the hinged posts in position.

JOHN KEYS.

Witnesses:
W. C. DUVALL,
P. T. DODGE.